US012681599B2

(12) United States Patent
Zhang et al.

(10) Patent No.: US 12,681,599 B2
(45) Date of Patent: Jul. 14, 2026

(54) DISPLAY PANEL, DRIVING CHIP, AND DISPLAY DEVICE

(71) Applicant: Xiamen Tianma Micro-Electronics Co., Ltd., Xiamen (CN)

(72) Inventors: Qiaoling Zhang, Xiamen (CN); Jun Li, Xiamen (CN); Kang Yang, Xiamen (CN); Jingxiong Zhou, Xiamen (CN); Kangpeng Yang, Xiamen (CN); Ping Zuo, Xiamen (CN); De Kang, Xiamen (CN); Shuai Ye, Xiamen (CN); Chuan Liu, Xiamen (CN)

(73) Assignee: Xiamen Tianma Micro-Electronics Co., Ltd., Xiamen (CN)

( * ) Notice: Subject to any disclaimer, the term of this patent is extended or adjusted under 35 U.S.C. 154(b) by 42 days.

(21) Appl. No.: 18/676,247

(22) Filed: May 28, 2024

(65) Prior Publication Data

US 2025/0298481 A1      Sep. 25, 2025

(30) Foreign Application Priority Data

Mar. 20, 2024    (CN) .......................... 202410323379.3

(51) Int. Cl.
  *G06F 3/041* (2006.01)
(52) U.S. Cl.
  CPC ........ *G06F 3/04164* (2019.05); *G06F 3/0412* (2013.01); *G06F 3/04184* (2019.05)

(58) Field of Classification Search
None
See application file for complete search history.

(56) References Cited

FOREIGN PATENT DOCUMENTS

KR      20160150486 A  * 12/2016  ........... G06F 3/0412

OTHER PUBLICATIONS

Translation of KR-20160150486-A into English; Moon (Year: 2016).*

* cited by examiner

*Primary Examiner* — Brian M Butcher
(74) *Attorney, Agent, or Firm* — Anova Law Group, PLLC

(57)          ABSTRACT

A display panel, a driving chip, and a display device are provided. The display panel includes: a plurality of pixel columns connected to a plurality of data lines where the plurality of data lines includes first data lines; a plurality of touch channels connected to a plurality of touch leads; a plurality of bonding terminals including first bonding terminals; and first gating circuits. The first bonding terminals are used for transmission of data signals and touch signals in a time-sharing manner. One first gating circuit is connected between one corresponding first bonding terminal, one corresponding first data line, and one corresponding touch lead, and is used to connect the corresponding first data line and the corresponding touch lead to the corresponding first bonding terminal in a time-sharing manner.

18 Claims, 10 Drawing Sheets

DISPLAY PANEL, DRIVING CHIP, AND DISPLAY DEVICE

CROSS-REFERENCE TO RELATED APPLICATION

This application claims the priority to Chinese Patent Application No. 202410323379.3, filed on Mar. 20, 2024, the content of which is incorporated herein by reference in its entirety.

TECHNICAL FIELD

The present disclosure generally relates to the field of display technology and, more particularly, relates to a display panel, a driving chip, and a display device.

BACKGROUND

A display panel may have a display function and a touch function. In some implementations, the touch and display functions of the display panel are independently controlled by two chips. Because of the high cost of the chip, in some other implementations, the touch and display functions of the display panel are controlled by a touch and display driver integration (TDDI) chip.

When one same TDDI chip controls the touch function and display function, the number of bonding terminals on the display panel and the number of pins of the TDDI chip increase, making the bonding process more difficult and affecting product yield.

SUMMARY

One aspect of the present disclosure provides a display panel. The display panel includes: a plurality of pixel columns connected to a plurality of data lines, where the plurality of data lines includes first data lines; a plurality of touch channels connected to a plurality of touch leads; a plurality of bonding terminals including first bonding terminals; and first gating circuits. The first bonding terminals are used for transmission of data signals and touch signals in a time-sharing manner. One first gating circuit is connected between one corresponding first bonding terminal, one corresponding first data line, and one corresponding touch lead, and is used to connect the corresponding first data line and the corresponding touch lead to the corresponding first bonding terminal in a time-sharing manner.

Another aspect of the present disclosure provides a driving chip. The driving chip includes: a plurality of output pins. The plurality of output pins includes first output pins used to transmit data signals and touch signals in a time-sharing manner.

Another aspect of the present disclosure provides a display device. The display device includes a display panel and a driving chip. The display panel includes: a plurality of pixel columns connected to a plurality of data lines where the plurality of data lines includes first data lines; a plurality of touch channels connected to a plurality of touch leads; a plurality of bonding terminals including first bonding terminals; and first gating circuits. The first bonding terminals are used for transmission of data signals and touch signals in a time-sharing manner. One first gating circuit is connected between one corresponding first bonding terminal, one corresponding first data line, and one corresponding touch lead, and is used to connect the corresponding first data line and the corresponding touch lead to the corresponding first bonding terminal in a time-sharing manner. The driving chip includes: a plurality of output pins. The plurality of output pins includes first output pins used to transmit data signals and touch signals in a time-sharing manner. The first output pins of the driving chips are electrically connected to the first bonding terminals of the display panel.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Figure 1:
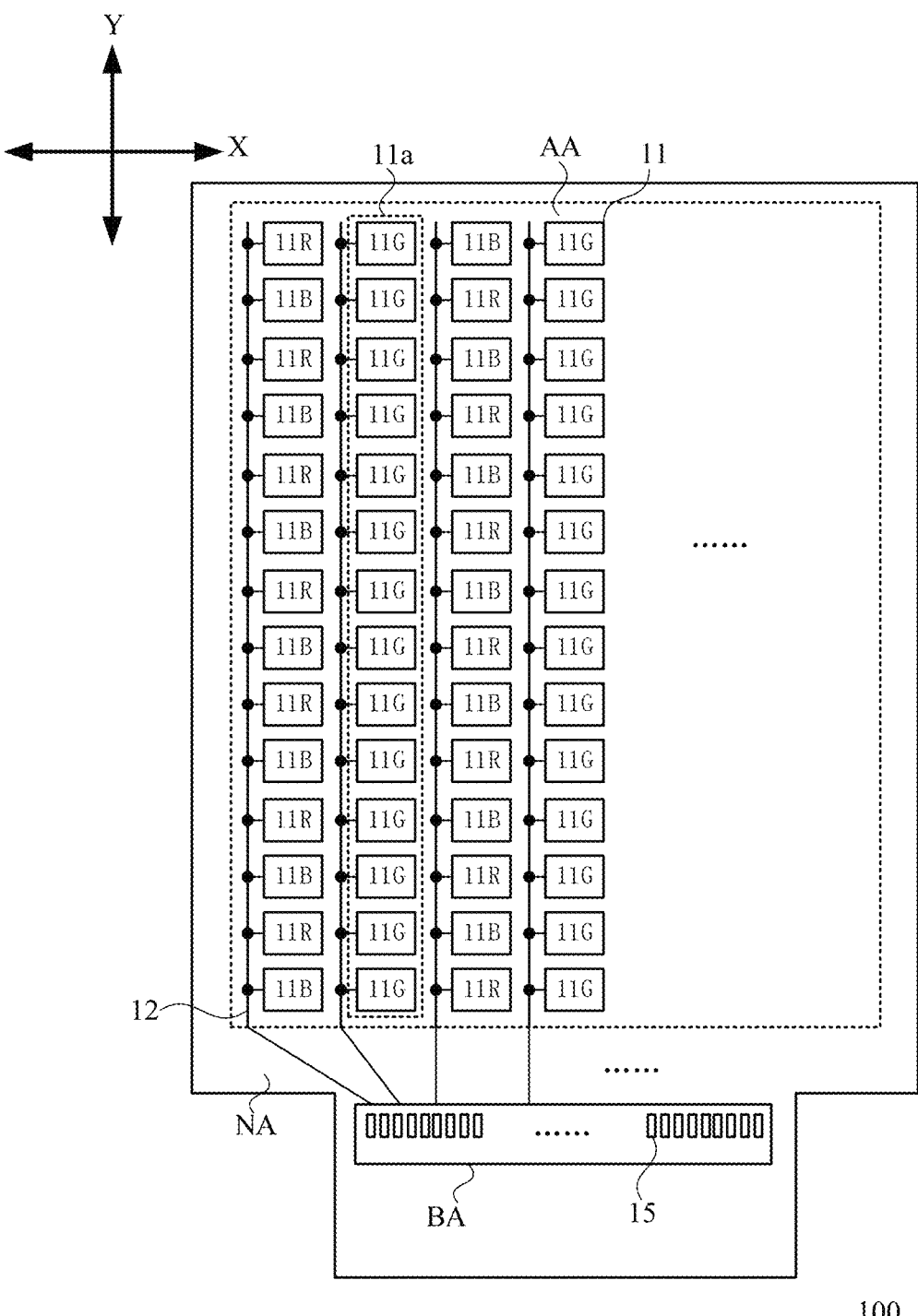
FIG. 1 illustrates a top view of an exemplary display panel consistent with various disclosed embodiments in the present disclosure.

Reference will now be made in detail to exemplary embodiments of the disclosure, which are illustrated in the accompanying drawings. Hereinafter, embodiments consistent with the disclosure will be described with reference to drawings. In the drawings, the shape and size may be exaggerated, distorted, or simplified for clarity. Wherever possible, the same reference numbers will be used throughout the drawings to refer to the same or like parts, and a detailed description thereof may be omitted.

Further, in the present disclosure, the disclosed embodiments and the features of the disclosed embodiments may be combined under conditions without conflicts. It is apparent that the described embodiments are some but not all of the embodiments of the present disclosure. Based on the disclosed embodiments, persons of ordinary skill in the art may derive other embodiments consistent with the present disclosure, all of which are within the scope of the present disclosure.

Moreover, the present disclosure is described with reference to schematic diagrams. For the convenience of descriptions of the embodiments, the cross-sectional views illustrating the device structures may not follow the common proportion and may be partially exaggerated. Besides, those schematic diagrams are merely examples, and not intended to limit the scope of the disclosure. Furthermore, a three-dimensional (3D) size including length, width, and depth should be considered during practical fabrication.

In the present disclosure, relational terms such as first and second are only used to distinguish one entity or operation from another entity or operation, and do not necessarily require or imply any such actual relationship between these entities or operations or order. Moreover, the terms "including", "comprising" or any other variants thereof are intended to cover non-exclusive inclusion, such that a process, method, article, or device that includes a series of elements includes not only those elements, but also those that are not explicitly listed or also include elements inherent to this process, method, article or equipment. If there are no more restrictions, the elements defined by the sentence "including . . . " do not exclude the existence of other same elements in the process, method, article, or equipment that includes the elements.

It should be understood that when describing the structure of a component, when a layer or region is referred to as being "on" or "above" another layer or another region, the layer or region may be directly on the other layer or region, or indirectly on the other layer or region, for example, layers/components between the layer or region and another layer or another region. And, for example, when the component is reversed, the layer or region may be "below" or "under" the other layer or region. In the present disclosure, the term "electrical connection" refers to that two components are directly electrically connected with each other, or the two components are electrically connected via one or more other components.

Problems in the existing technology will be explained in detail first.

A touch structure is usually set in a display panel to realize a display function and at ouch function. Touch structures usually include self-capacitive structures and mutual-capacitive structures.

For a self-capacitive touch structure, each independent touch terminal is used as a sensing unit. For a touch structure with 40 rows and 20 columns, 40*20=800 pins are usually required for driving.

For a mutual capacitive touch structure, touch units in one row or in one column are one same touch logic unit. For a touch structure with 40 rows and 20 columns, 40+20=60 pins are usually required for driving.

To realize the display function in the display panel, the number of pins required in a driving chip is relatively large. For example, some products require 2568 to 2880 pins. When using the TDDI chip to control touch and display, the number of pins in the driving chip further increases, and the number of bonding terminals in the display panel also further increases, which poses a huge challenge to the bonding process. Especially for display panels using flexible substrates, the further increase in the number of pins and bonding terminals will cause higher process challenges. Also, the current process capabilities of existing bonding machines are relatively fixed, which will cause a certain yield loss.

The present disclosure provides a display panel, a driving chip, and a display device, to at least partially alleviate the above problems.

The present disclosure provides a display panel. In one embodiment, the display panel may be an organic light-emitting diode (OLED) display panel. Those skilled in the art should understand that, in some other embodiments, for example, the display panel may also be a micro light-emitting diode (Micro LED) display panel, a mini light-emitting diode (Mini LED) display panel, a liquid crystal display panel, or a quantum dot display panel, etc.

As shown in FIG. 1, in one embodiment, the display panel 100 may include a display area AA and a non-display area NA. The non-display area NA may at least partially surround the display area AA. The non-display area NA may include a bonding area BA. The bonding area may include a plurality of bonding terminals 15.

In one embodiment, the plurality of bonding terminals 15 may be bonded to pins of a driving chip, and the driving signals of the driving chip may be transmitted to the plurality of bonding terminals 15 through the pins.

In another embodiment, the plurality of bonding terminals 15 may be bonded and connected to a flexible printed circuit (FPC), and the driving chip may be disposed on the FPC. The pins of the driving chip may be electrically connected to the plurality of bonding terminals 15 through the FPC, such that the driving signals of the driving chip may be transmitted to the plurality of bonding terminals 15 through the pins and the FPC.

The display area AA may include a plurality of pixel columns 11a arranged along a first direction X. One pixel column 11a of the plurality of pixel columns 11a may include a plurality of pixels 11 arranged along a second direction Y. The first direction X and the second direction Y may intersect. In one embodiment, the first direction X may be the row direction, and the second direction Y may be the column direction. Of course, in some other embodiments, the row direction and the column direction may be interchanged.

As an example, in one embodiment, the plurality of pixels 11 may include pixels with different emitting colors. For example, the plurality of pixels 11 may include red pixels 11R, green pixels 11G, and blue pixels 11B. The red pixels 11R may be used to emit red light, the green pixels 11G may be used to emit green light, and the blue pixels 11B may be used to emit blue light.

In one embodiment, in some pixel columns 11a of the plurality of pixel columns 11a, the red pixels 11R and blue pixels 11B may be alternately arranged. Others of the plurality of pixel columns 11a may only include green pixels 11G. Of course, this is only an example and is not used to limit the arrangement of pixels in the present disclosure. Those skilled in the art should understand that the arrangement of pixels may also be implemented in other ways.

As shown in FIG. 1, in one embodiment, the display panel 100 may further include data lines 12. The plurality of pixel columns 11a may be connected to the data lines 12. The data lines 12 may be used to transmit data signals to the plurality of pixels 11. The plurality of pixels 11 may generate driving current according to the size of received data signals, to drive light-emitting elements to emit light. In one embodiment shown in FIG. 1, one of the plurality of pixel columns 11a may be connected to one data line 12 correspondingly. In some other embodiments, two or more pixel columns 11a of the plurality of pixel columns 11a may share one data line 12. In some other embodiments, one pixel column 11a of the plurality of pixel columns 11a may use two or more data lines 12. The connection method between the plurality of pixel rows 11a and the data lines 12 is not limited in the present disclosure.

Figure 2:
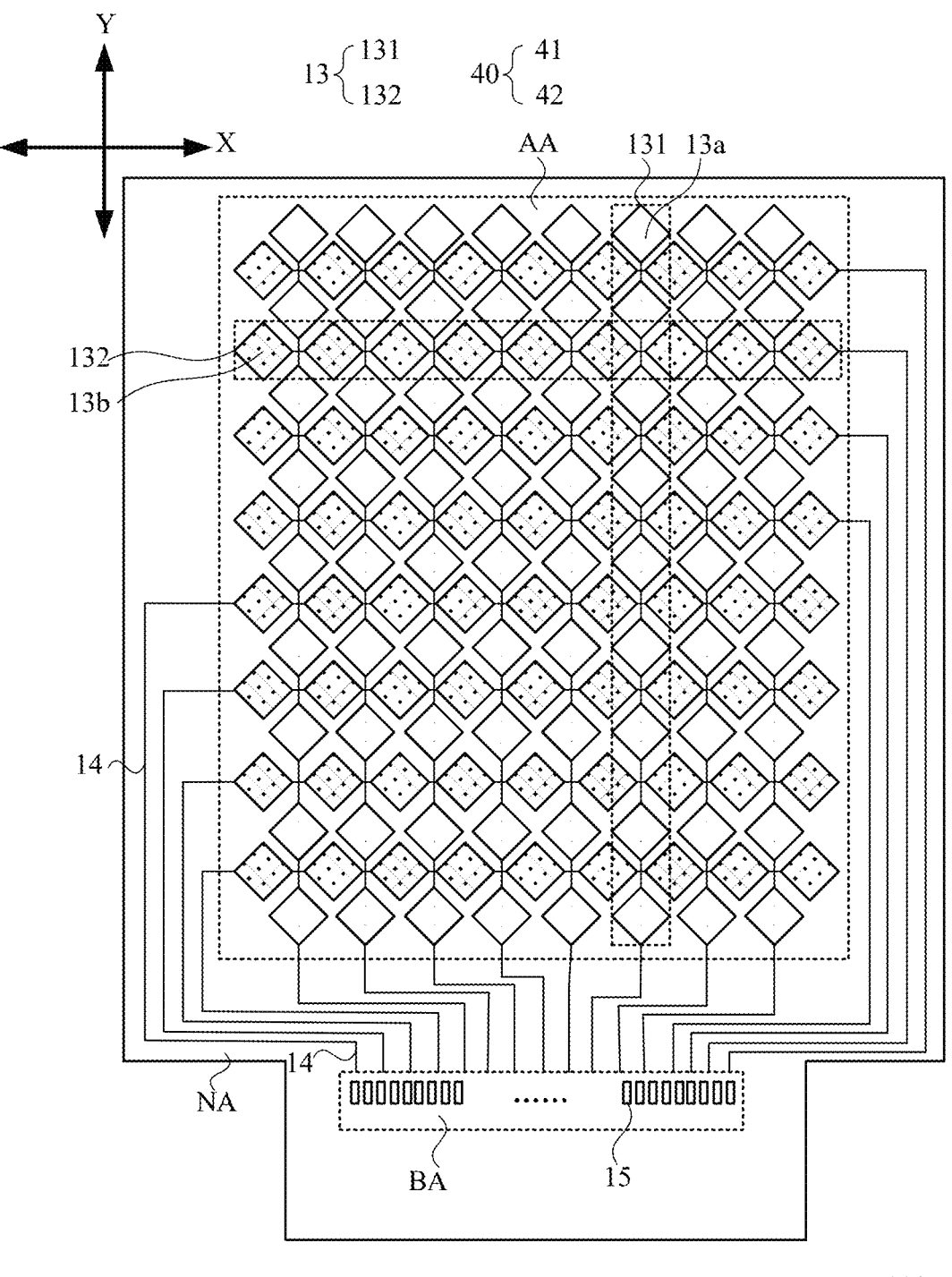
FIG. 2 illustrates a top view of another exemplary display panel consistent with various disclosed embodiments in the present disclosure.

As shown in FIG. 2, in one embodiment, the display area AA of the display panel 100 may further include touch channels 13, and one touch channel 13 may include at least one touch terminal 13 a. In the embodiment shown in FIG. 2, the display panel may use a mutual capacitance touch architecture, and the touch channels 13 may include first touch channels 131 and second touch channels 132. One first touch channel 131 may include a plurality of interconnected first touch terminals 13a. One second touch channel 132 may include a plurality of interconnected second touch terminals 13b. The first touch channels 131 and the second touch channel s132 may intersect and may be insulated from each other. One of the first touch channels 131 and the second touch channels 132 may serve as touch driving channels, and the other may serve as touch sensing channels. Of course, in some other embodiment, the touch structure of the display panel may also be self-capacitive, and FIG. 2 is used as an example only and does not limit the scope of the present disclosure.

The touch channels 13 may be connected to touch leads 14. In the mutual capacitance touch architecture, part of the touch leads 14 may be used to transmit driving signals from the driving chip to the touch drive channels, and the other part of the touch leads 14 may be used to transmit sensing signals to the driving chips In the self-capacitive touch architecture, the touch leads 14 may be used to transmit driving signals and sensing signals in a time-sharing manner.

It should be noted that, to clearly illustrate the plurality of pixel columns 11a, the data lines 12, the touch channels 13, and the touch leads 14 in the display panel 100, the touch channels 13 and the touch leads 14 are not shown in FIG. 1, and the plurality of pixel column 11a and the data lines 12 are not shown in FIG. 2. Those skilled in the art should understand that in some embodiments, the touch channels 13 and the plurality of pixel columns 11a and/or the data lines 12 may at least partially be located in the thickness direction of the display panel. In some other embodiments, pixel terminals (anodes of the light-emitting elements) and/or common terminals (cathodes of the light-emitting elements) of the plurality of pixels 11 may be multiplexed as the touch terminals in the touch channels.

Figure 3:
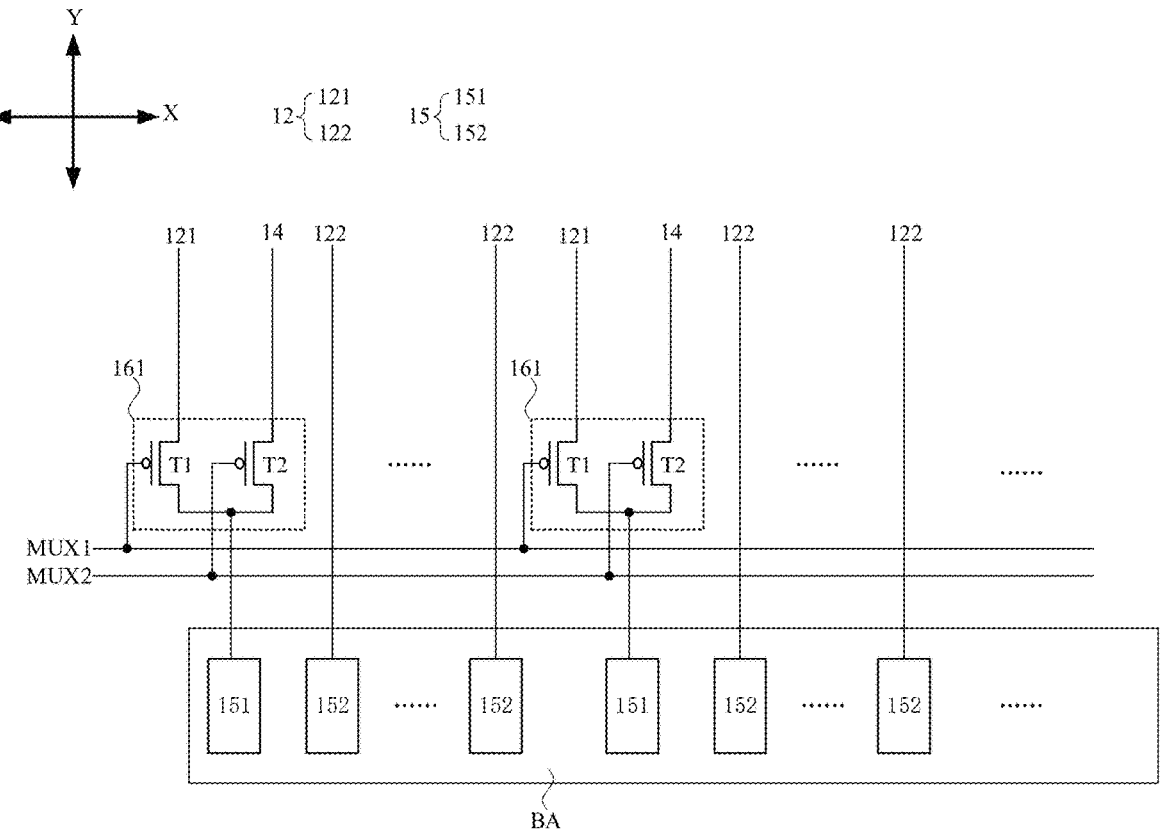
FIG. 3 illustrates a partial structure of an exemplary display panel consistent with various disclosed embodiments in the present disclosure.

As shown in FIG. 3, in one embodiment, some of the plurality of data lines 12 may serve as first data lines 121. Some of the plurality of bonding terminals 15 may be used as first bonding terminals 151. The first bonding terminals 151 may be connected to both the first data lines 121 and the touch leads 14. The first bonding terminals 151 may be used for transmitting the data signals and the touch signals in a time-sharing manner.

To realize the transmission of the data signal of the first bonding terminals 151 to the first data lines 121 and the transmission of the touch signals between the first bonding terminals 151 and the touch leads 14, in one embodiment, the display panel 100 may further include first gating circuits 161. One first gating circuit 161 may be connected between one corresponding first bonding terminal 151, one corresponding first data line 121, and one corresponding touch lead 14. The first gating circuit 161 may be used to connect the corresponding first data line 121 and the corresponding touch lead 14 to the corresponding first bonding terminal 151 in a time-sharing manner.

As shown in FIG. 3, the first gating circuits 161 may be located between the display area AA and the bonding area BA. The number of first gating circuits 161 may be multiple, and the number of first gating circuits 161 may be equal to the number of first bonding terminals 151.

When one first gating circuit 161 connects one corresponding first data line 121 and one corresponding first bonding terminal 151, one corresponding touch lead 14 and the corresponding first bonding terminal 151 may be disconnected. At this time, the corresponding first bonding terminal 151 may provide the data signal to the corresponding first data line 121. When the first gating circuit 161 connects the corresponding touch lead 14 and the corresponding first bonding terminal 151, the corresponding first data line 121 and the corresponding first bonding terminal 151 may be disconnected. At this time, the signal on the corresponding first bonding terminal 151 and the corresponding touch lead 14 may be the touch signals.

In the display panel provided by the embodiments of the present disclosure, the first data lines 121 and the touch leads 14 may be connected to the first bonding terminals 151 through the first gating circuits 161. The first bonding terminals 151 may be used to transmit the data signals and the touch signals in a time-sharing manner. One first gating circuit 161 may be used to connect one corresponding first data line 121 and one corresponding touch lead 14 to one corresponding first bonding terminal 151 in a time-sharing manner, such that the corresponding first bonding terminal 151 may be shared by the data signals and the touch signals in a time-sharing manner. Compared with solutions using different bonding terminals for the data signals and the touch signals, the embodiments of the present disclosure may multiplex some bonding terminals without increasing the total number of bonding terminals, thereby avoiding an increase in the difficulty of the bonding process and ensuring product yield.

To achieve a better resolution, the number of the plurality of pixel columns 11a may be larger, and the total number of the data lines 12 required may also be larger. For example, the total number of the data lines 12 may be much larger than the total number of the touch leads 14. Therefore, the total number of the bonding terminals required for the data lines 12 may also be larger than the total number of the bonding terminals required for the touch leads 14.

In some embodiments, as shown in FIG. 3, some bonding terminals in the plurality of bonding terminals 15 may be second bonding terminals 152, and some data lines among the plurality of data lines 12 may be second data lines 122. One second bonding terminal 152 may be connected to one corresponding second data line 122, and may not be connected to the touch leads 14. The second bonding terminals 152 may be used to transmit the data signals but not the touch signals.

For example, the total number of the bonding terminals required for all of the data lines 12 may be N1, and the total number of the bonding terminals required for all of the touch leads may be N2. Therefore, the total number of the bonding terminals may be N1, N2 bonding terminals may be multiplexed by the data signals and the touch signals. N1-N2 bonding terminals may only transmit data signals and may be no longer reused.

Figure 4:
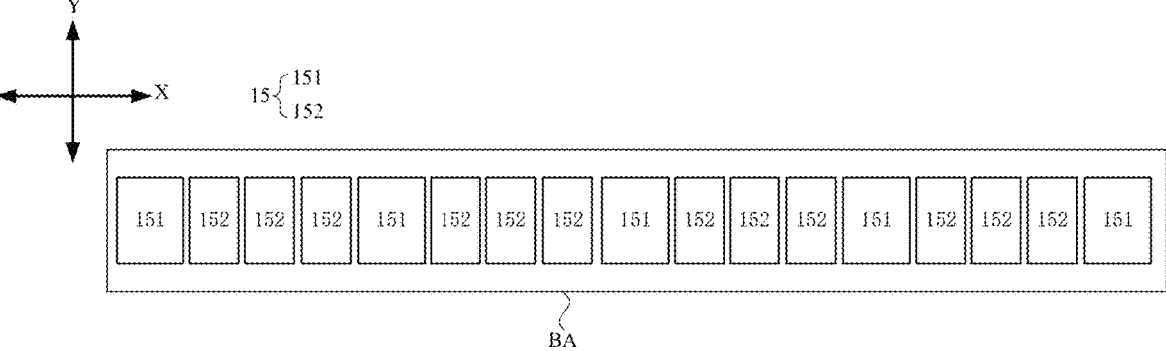
FIG. 4 illustrates a schematic structure of bonding terminals of an exemplary display panel consistent with various disclosed embodiments in the present disclosure.

In some embodiments, as shown in FIG. 2, the touch leads 14 may converge toward the bonding area BA, and the touch leads 14 close to the bonding area BA may be distributed along the first direction X. To facilitate the connection between the touch leads 14 and the first bonding terminals 151, as shown in FIG. 4, the bonding terminals 15 may be arranged in at least one row along the first direction X. In the same row, the first bonding terminals 15 and the second bonding terminals 152 may be alternately distributed. In contrast to a plurality of first bonding terminals 151 concentrated on one side, when the first bonding terminals 151 and the second bonding terminals 152 are alternately distributed, one first bonding terminal 151 may be close to one corresponding touch lead 14 to be connected to with the first bonding terminal 151, making it easier to connect the first bonding terminal 151 and the corresponding touch lead 14.

When the total number of the bonding terminals required for the data lines 12 is relatively large, the number of the second bonding terminals 152 may be relatively large. Correspondingly, in the same row, multiple second bonding terminals 151 may be disposed between two adjacent first bonding terminals 151.

As shown in FIG. 2, the touch leads 14 close to the bonding area BA may be generally evenly distributed along the first direction X. As an example, in one same row, the first bonding terminals 151 may be also evenly distributed in the first direction X. That is, the distance between any two adjacent first bonding terminals 151 may be equal in n the first direction X. For example, along the first direction X, every first bonding terminal 151 may be provided at an interval of 4 mm.

When the sizes of the second bonding terminals 152 are the same, the number of the second bonding terminals 152 arranged between every two adjacent first bonding terminals 151 may be the same.

Further, the first gating circuits 161 connected to the first bonding terminals 151 may be disposed close to the first bonding terminals 151. When the first bonding terminals 151 are evenly distributed in the first direction, the first gating circuits 161 may be also uniformly distributed in the first direction X.

For example, in one embodiment, as shown in FIG. 3, one first gating circuit 161 may include a first transistor T1 and a second transistor T2. The first transistor T1 may be connected between one corresponding first data line 121 and one corresponding first bonding terminal 151. The second transistor T2 may be connected between one corresponding touch lead 14 and the corresponding first bonding terminal 151. The gate of the first transistor T1 may be connected to a corresponding first control line MUX1, and the gate of the second transistor T2 may be connected to a corresponding second control line MUX2.

The working process of the display panel may include a display phase and a touch detection phase. In the display phase, the first transistor T1 may be turned on and the second transistor T2 may be turned off. In the touch detection phase, the second transistor T2 may be turned on and the first transistor T1 may be turned off.

One second bonding terminal 152 may be connected to one corresponding second data line 122, and the second bonding terminals 152 may not need to be connected to the touch leads 14. For ease of explanation, the path through which the data signal is transmitted to the first data line 121 through the first bonding terminal 151 and the first transistor T1 is called the first path, and the path through which the data signal is transmitted through the second bonding terminal 152 to the second data line 122 is called the second path. Compared with the second path, the first path may additionally include the first transistor T1, and the impedance of the transistor T1 may be larger than the impedance of the wiring. Therefore, during the display stage of the display panel, the impedance on the first path may be higher than the impedance on the second path, thus affecting the display effect.

The impedance difference between the above-mentioned first path and the second path may be reduced through various implementation methods.

In an implementation manner to reduce the impedance difference between the first path and the second path, the impedance of the first bonding terminal 151 may be set to be smaller than the impedance of the second bonding terminal 152. Since the impedance of the first bonding terminal 151 is small, the overall impedance of the first path may tend to be consistent with the overall impedance of the second path even when the data signal is transmitted through the first bonding terminal 151 to the first data line 121 through the first transistor T1. Therefore, the impedance difference between the first path and the second path may be reduced, improving the display effect.

As an example, in one embodiment, an area of an orthogonal projection of the first bonding terminal 151 on the substrate of the display panel may be larger than an area of an orthogonal projection of the second bonding terminal 152 on the substrate of the display panel. That is, the first bonding terminal 151 may be designed to be larger, and the second bonding terminal 152 may be designed to be smaller. When the first bonding terminal and the second bonding terminal are made of same materials, the impedance of one bonding terminal may be smaller when the area of the bonding terminal is larger. For example, in the first direction X, the width of the first bonding terminal 151 may be larger than the width of the second bonding terminal 152, and the length of the first bonding terminal 151 may be equal to the length of the second bonding terminal 152 in the second direction Y.

In another implementation manner to reduce the impedance difference between the first path and the second path, the width-to-length ratio of the channel of the first transistor T1 may be increased to reduce the impedance of the first transistor T1, thereby reducing the impedance difference between the first path and the second path. The width-to-length ratio of the channel is the ratio of the channel width of a transistor to its conducting length.

Figure 5:
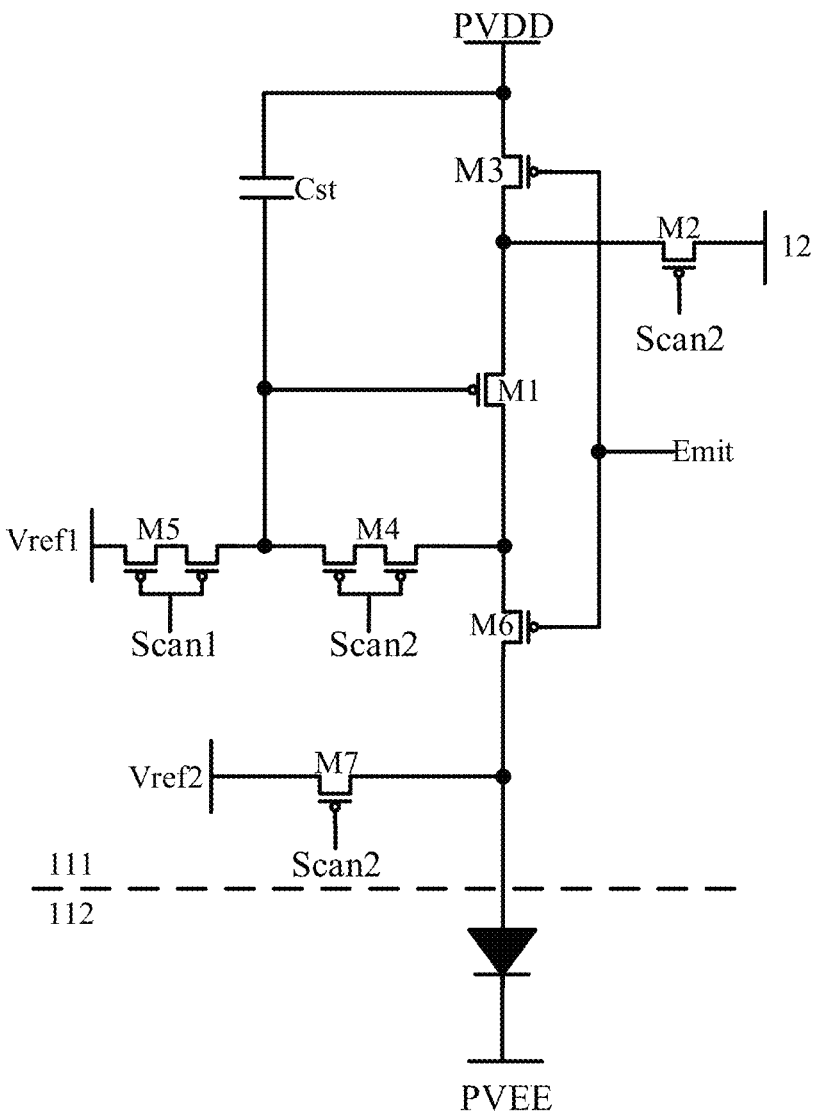
FIG. 5 illustrates a schematic structure of a pixel circuit of an exemplary display panel consistent with various disclosed embodiments in the present disclosure.

For example, as shown in FIG. 5, one pixel 11 may include a pixel circuit 111 and a light-emitting element 112. The pixel circuit 111 is connected to the light-emitting element 112 to drive the light-emitting element 112 to emit light.

The pixel circuit 111 may include driving transistors and switching transistors. The driving transistors may be used to generate a driving current. Driven by the driving current, the light-emitting element 112 may emit light. FIG. 5 exemplarily shows a pixel circuit with a "7T1C" structure where "T" represents a transistor and "C" represents a capacitor. The "7T1C" structure may include 7 transistors and 1 capacitor. In FIG. 5, transistors M2 to M7 may be all used as switching transistors, and transistor M1 may be used as the driving transistor.

To improve the driving capability of the driving transistor, the width-to-length ratio of the channel of the driving transistor may be usually larger than the width-to-length ratio of the channel of the switching transistor in the pixel circuit. When the width-to-length ratio of the channel of a transistor is larger, the area occupied by the transistor may be larger.

In some embodiments, the width-to-length ratio of the channel of the first transistor T1 may be larger than the width-to-length ratio of the channel of the switching transistor in the pixel circuit, thereby increasing the width-to-length ratio of the channel of the first transistor T1.

In some other embodiments, the width-to-length ratio of the channel of the first transistor T1 may be less than or equal to the width-to-length ratio of the channel of the driving transistor in the pixel circuit. Therefore, the width-to-length ratio of the channel of the first transistor T1 may be increased to a certain extent while the area occupied by the first transistor T1 may be taken into account, thereby facilitating the realization of a narrow frame.

In another implementation manner of reducing the impedance difference between the first path and the second path, the overall impedance of the connection line used to connect the devices on the first path may be reduced.

Figure 6:
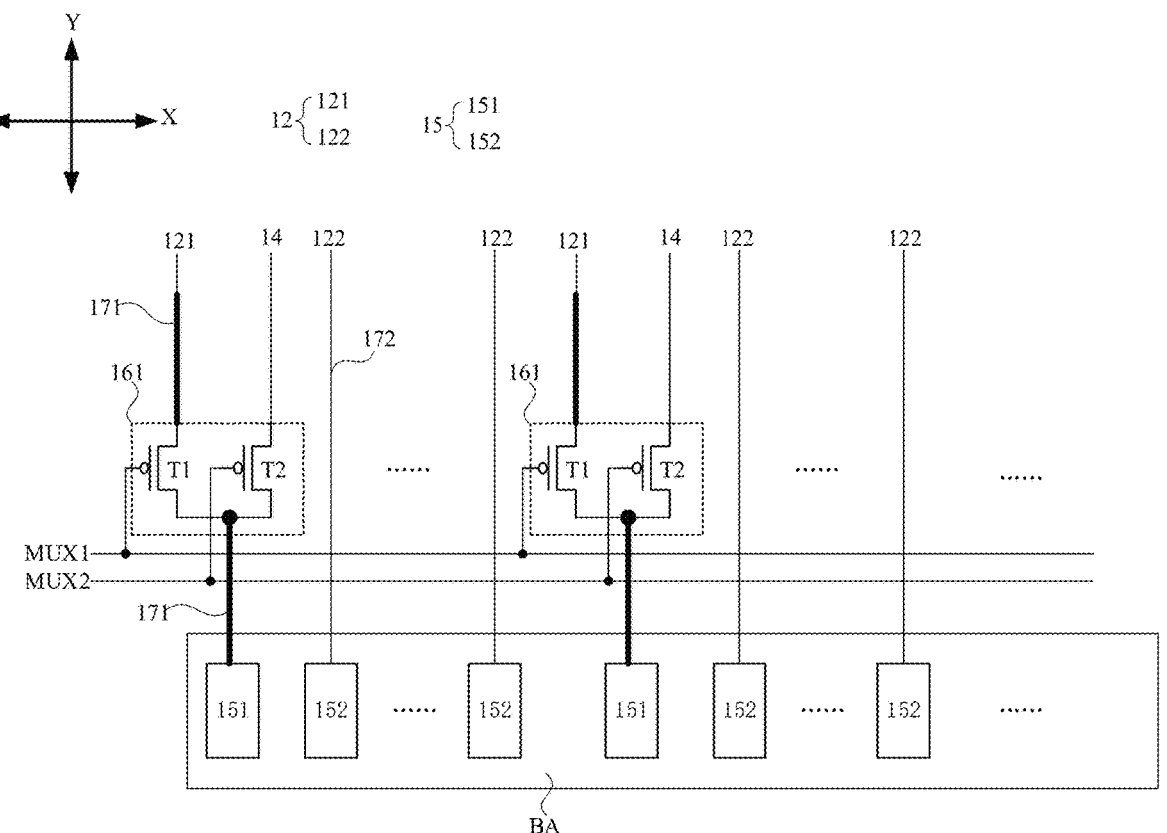
FIG. 6 illustrates a partial structure of another exemplary display panel consistent with various disclosed embodiments in the present disclosure.

For example, in one embodiment, as shown in FIG. 6, the first bonding terminal 151 may be connected to the first data line 121 through a first connection line 171, and the second bonding terminal 152 may be connected to the second data line 122 through a second connection line 172. The first connection line 171 may include two sections. One section of the first connection line 171 may be connected between the first bonding terminal 151 and the first transistor T1, and another section may be connected between the first transistor T1 and the first data line 121.

For example, when the wiring length of the first connection line 171 and the wiring length of the second connection line 172 are substantially equal, the impedance per unit length of the first connection line 171 may be smaller than the impedance per unit length of the second connection line 172. Therefore, the overall impedance of the first connection line 171 may be reduced to reduce the impedance difference between the first path and the second path.

For another example, when the impedance per unit length of the first connection line 171 is substantially equal to the impedance per unit length of the second connection line 172, the length of the first connection line 171 may be designed to be smaller than the length of the second connection line 172. Therefore, the overall impedance of the first connection line 171 may also be reduced.

In one embodiment, the wiring width of the first connection line 171 may be larger than the wiring width of the second connection line 172, thereby reducing the impedance per unit length of the first connection line 171.

In another embodiment, the first connection line 171 and the second connection line 172 may be made of a same material.

With the development of display technology, the display panel is developing towards a direction of higher and higher resolutions. Therefore, a larger number of data lines 12 are required. If one bonding terminal 15 is only used for one data line 12, the total number of the required bonding terminals 15 may be very large, which will undoubtedly increase the difficulty of the bonding process. Moreover, the bonding terminals 15 and the pins of the driving chips are usually connected in a one-to-one correspondence, which will also increase the number of pins of the driving chips and increase the cost of the driving chips.

Figure 7:
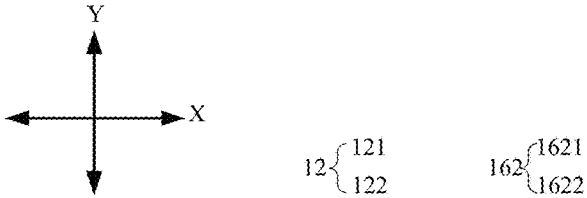
FIG. 7 illustrates a partial structure of another exemplary display panel consistent with various disclosed embodiments in the present disclosure.
Figure 7:
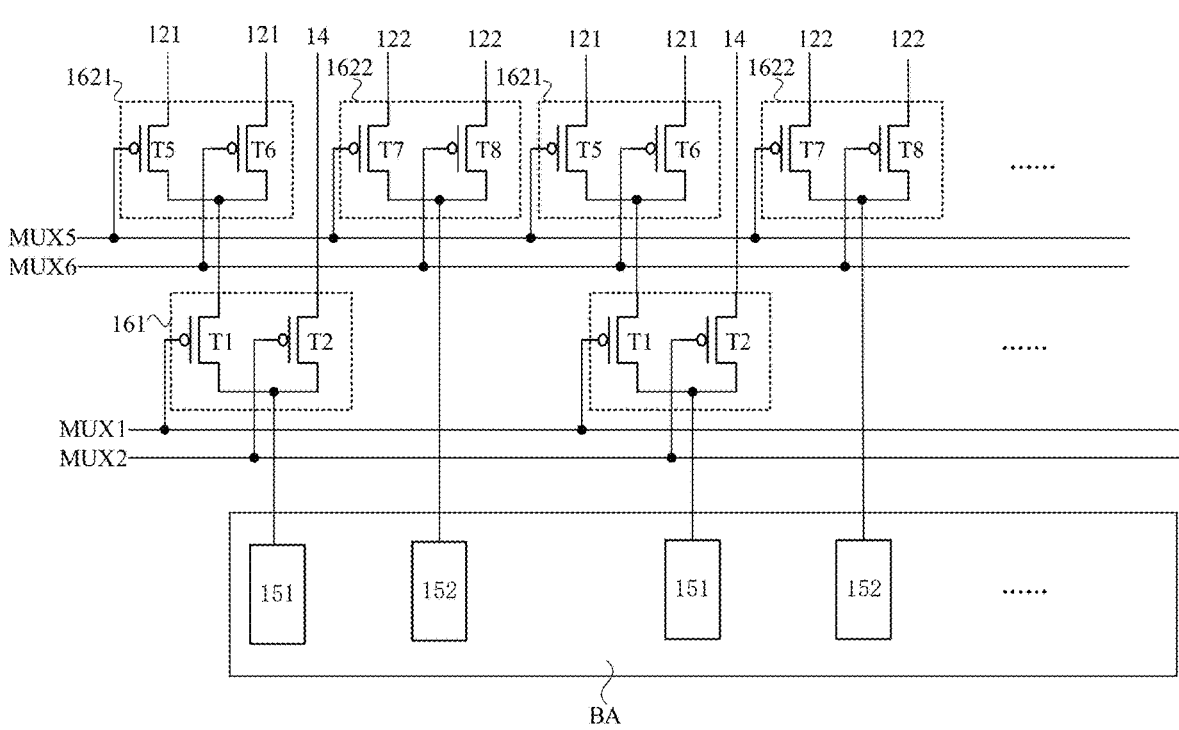

In some embodiments, as shown in FIG. 7, the display panel may further include second gating circuits 162. One second gating circuit 162 may include a first gating unit 1621 and a second gating unit 1622. The first gating unit 1621 may be connected between multiple first data lines 121 and one corresponding first gating circuit 161, and the second gating unit 1622 may be connected between multiple corresponding second data lines 122 and one corresponding second bonding terminal 152. Therefore, one first bonding terminal 151 may be shared by multiple first data lines 121, and one second bonding terminal 152 may be shared by multiple second data lines 122. The total number of the bonding terminals may be reduced, thereby reducing the difficulty of the bonding process and also helping to reduce the cost of the driving chips.

The second gating circuits 162 may be disposed in the non-display area NA.

In one second gating circuit 162, the input terminal of the first gating unit 1621 may be connected to the first transistor T1, and multiple output terminals of the first gating unit 1621 may be respectively connected to the multiple first data lines 121. As an example, the first gating unit 1621 may include a transistor T5 and a transistor T6. A first terminal of the transistor T5 and a first terminal of the transistor T6 may both be connected to the first transistor T1. A second terminal of the transistor T5 may be connected to one corresponding first data line 121, and a second terminal of the transistor T6 may be connected to another corresponding first data line 121.

In the second gating circuit 162, the input terminal of the second gating unit 1622 may be connected to the second bonding terminal 152, and the multiple output terminals of the second gating unit 1622 may be respectively connected to the multiple second data lines 122. As an example, the second gating unit 1622 may include a transistor T7 and a transistor T8. A first terminal of the transistor T7 and a first terminal of the transistor T8 may be both connected to the second bonding terminal 152. A second terminal of the transistor T7 may be connected to one of the corresponding second data lines 122, and a second terminal of the transistor T8 may be connected to another one of the corresponding second data lines 122.

For example, in one embodiment, the gate of the transistor T5 and the gate of the transistor T7 may be both connected to the control line MUX, and the gate of the transistor T6 and the gate of the transistor T8 may be both connected to the control line MUX6.

The working process of the display panel may include the display phase and the touch detection phase. In the display phase, the first transistor T1 may be turned on, the second transistor T2 may be turned off, and the transistors T5 and T6 may be turned on in a time-sharing manner, and the transistors T7 and T8 may be turned on in a time-sharing manner. For example, the transistor T5 and the transistor T7 may be turned on first, then the transistor T5 and the transistor T7 may be turned off, and the transistor T6 and the transistor T8 may be turned on. In the touch detection stage, the second transistor T2 may be turned on, the first transistor T1 may be turned off, and the transistors T5, T6, T7, and T8 may be turned off.

The present disclosure also provides a driving chip. The driving chip may be a TDDI chip, and may be used to control the display function and the touch function of the display panel.

Figure 8:
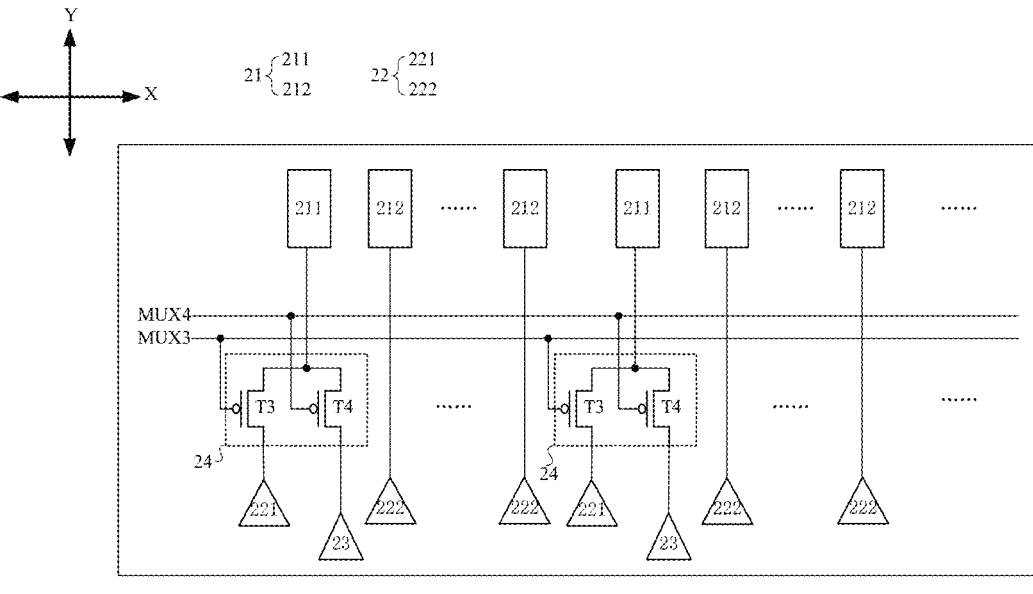
FIG. 8 illustrates a schematic structure of an exemplary driving chip consistent with various disclosed embodiments in the present disclosure.

In one embodiment as shown in FIG. 8, the driving chip 200 may include a plurality of output pins 21. The plurality of output pins 21 may include first output pins 211. The first output pins 211 may be used for transmission of data signals and touch signals in a time-sharing manner.

Exemplarily, in one embodiment, the plurality of output pins 21 of the driving chip 200 may be connected with the plurality of bonding terminals 15 of the display panel 100 in the above embodiments in a one-to-one correspondence. The first output pins 211 may be connected to the first bonding terminal 151.

In the driving chip provided by the embodiments of the present disclosure, the first output pins 211 may be used to transmit the data signals and the touch signals in a time-sharing manner. Therefore, the first output pins 211 may be multiplexed by the data signals and touch signals in a time-sharing manner. Compared with the situation where the data signals and touch signals use different output pins, the present disclosure may multiplex some output pins without increasing the total number of output pins, thereby avoiding an increase in the difficulty of the bonding process and helping to ensure product yield.

In some embodiments, as shown in FIG. 8, the driving chip 200 may also include a plurality of display driving circuits 22, a plurality of touch driving circuits 23 and third gating circuits 24.

The plurality of display driving circuits 22 may be used to process the data signals, and one display driving circuit 22 may include a first display driving circuit 221. An output terminal of the first display driving circuit 221 may be connected to one corresponding first output pin 211 through one corresponding third gating circuit 24.

The plurality of touch drive circuits 23 may be used to process the touch signals. For example, part of the touch drive circuits 23 may be used to transmit the touch drive signals, and another part of the touch drive circuits 23 may be used to receive the touch sensing signals. An output end of one touch driving circuit 23 may be also connected to one corresponding first output pin 211 through one corresponding third gating circuit 24.

One third gating circuit 24 may be used to connect one corresponding first display driving circuit 221 and one corresponding touch driving circuit 23 to one corresponding first output pin 211 in a time-sharing manner.

Figure 9:
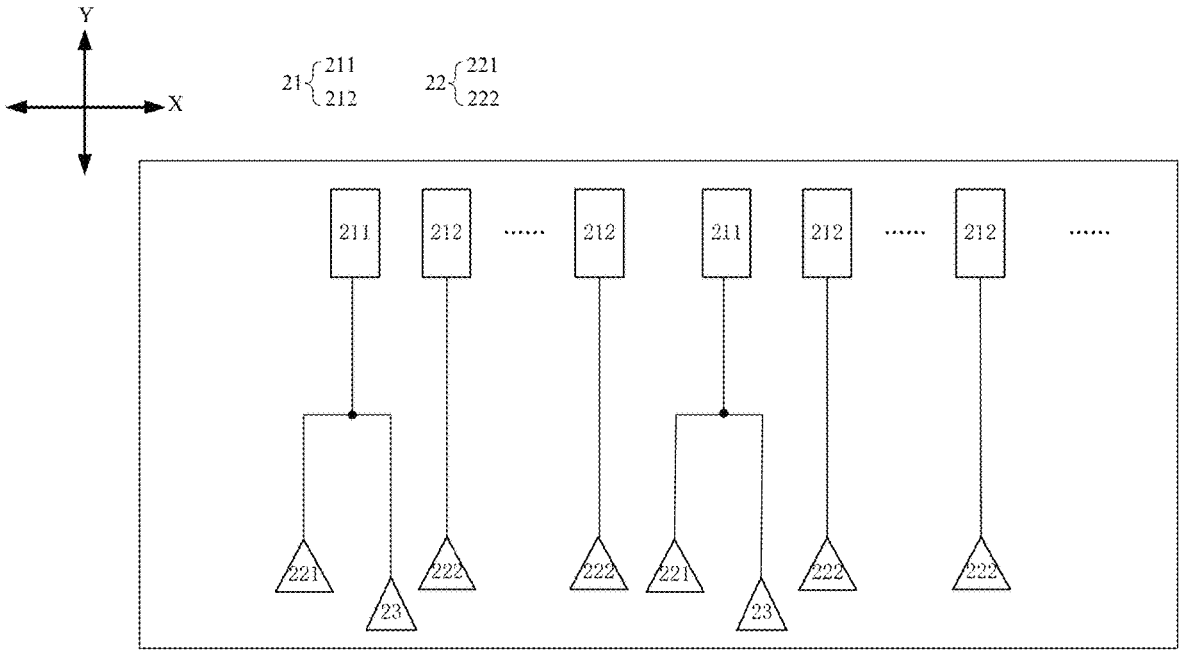
FIG. 9 illustrates a schematic structure of another exemplary driving chip consistent with various disclosed embodiments in the present disclosure.

In other embodiments, as shown in FIG. 9, gating circuits may not be provided in the connection paths between the first output pins 211 and the display driving circuits 22 and the touch driving circuits 23. When one first display driving circuit 221 transmits the data signal to one corresponding first output pin 211, one corresponding touch driving circuit 23 is in the non-working state. When the touch signal is transmitted between one touch driving circuit 23 and one corresponding first output pin 211, one corresponding first display driving circuit 221 may be in the non-working state. Therefore, even without gating circuits, the first output pins 211 may be able to transmit the data signal and the touch signal in a time-sharing manner, avoiding crosstalk between the data signal and the touch signal.

When one driving circuit is in the non-working state, the output terminal of the driving circuit may not output a signal to one corresponding first output pin 211 or the output terminal of the driving circuit may not receive a signal from the corresponding first output pin 211.

The total number of the bonding terminals required for the data lines 12 may be larger than the total number of the bonding terminals required for the touch leads 14, such that the total number of the output pins required for the data lines 12 may be larger than the total number of the output pins required for the touch leads 14.

In some embodiments, as shown in FIG. 8 or FIG. 9, some of the plurality of display driving circuits 22 may be second display driving circuits 222, and some of the plurality of output pins 21 may be second output pins 212. One second output pin 212 may be connected to one corresponding second display driving circuit 222, and the second output pins 212 may be not connected to the touch driving circuits 23. The second output pin 212 may be used for transmitting the data signals and does not transmit the touch signals.

For example, in one embodiment, the total number of the bonding terminals required for all data lines 12 may be N1, and the total number of bonding terminals required for all touch leads may be N2. Therefore, the total number of the output pins may be N1, and N2 output pins of the output pins may be multiplexed by the data signals and the touch signals. Further, N1-N2 output pins may only transmit the data signals and may be no longer multiplexed.

To facilitate the connection between the output pins of the driving chip and the corresponding bonding terminals, as shown in FIG. 8 or FIG. 9, multiple output pins 21 may be arranged in at least one row along the first direction X. The multiple first output pins 211 and the multiple second output pins 212 may be alternately distributed.

In one embodiment, for example, the multiple first output pins 211 may be distributed evenly in the first direction Y.

In one embodiment, as an example, in one same row, the multiple first output pins 211 may be also evenly distributed in the first direction X. That is, the distance between any two adjacent first output pins 211 may be equal in the first direction X. For example, along the first direction X, every first output pin 211 may be provided at an interval of 4 mm.

When the sizes of the second output pins 212 are the same, the number of the second output pins 212 arranged between every two adjacent first output pins 211 may be the same.

Further, the third gating circuits 24 connected to the first output pins 211 may be disposed close to the first output pins 211. When the first output pins 211 are evenly distributed in the first direction, the third gating circuits 24 may be also uniformly distributed in the first direction X.

For example, in one embodiment, as shown in FIG. 8, one third gating circuit 24 may include a third transistor T3 and a fourth transistor T4.

The first terminal of the third transistor T3 and the first terminal of the fourth transistor T4 may both be connected to one corresponding first output pin 21. The second terminal of the third transistor T3 may be connected to one corresponding first display driving circuit 221, and the second terminal of the fourth transistor T4 may be connected to one corresponding touch driving circuit 23. The gate of the third transistor T3 may be connected to a corresponding third control line MUX3, and the gate of the fourth transistor T4 may be connected to a corresponding fourth control line MUX4.

The working process of the display panel may include a display phase and a touch detection phase. In the display phase, the first transistor T1 may be turned on and the second transistor T2 may be turned off in the display panel, and the third transistor T3 may be turned on and the fourth transistor T4 may be turned off in the driving chip. In the touch detection phase, the second transistor T2 may be turned on and the first transistor T1 may be turned off in the display panel, and the third transistor T3 may be turned off and the fourth transistor T4 may be turned on in the driving chip.

One second output pin 212 may be connected to one corresponding second display driving circuit 222, and the second output pins 212 may not need to be connected to the touch driving circuits 23. For ease of explanation, the path through which the data signal is transmitted through the first output pin 212, the third transistor T3 and the first display driving circuit 221 is called the third path, and the path through which the data signal is transmitted through the second output pin 212 and the second display driving circuit 222 is called the second path. Compared with the fourth path, the third path may additionally include the third transistor T3, and the impedance of the third transistor T3 may be larger than the impedance of the wiring. Therefore, during the display stage of the display panel, the impedance on the third path may be higher than the impedance on the fourth path, thus affecting the display effect.

The impedance difference between the above-mentioned third path and the fourth path may be reduced through various implementation methods.

In an implementation manner to reduce the impedance difference between the first path and the second path, the impedance of the first output pin 211 may be set to be smaller than the impedance of the second output pin 212. Since the impedance of the first output pin 211 is small, the overall impedance of the third path may tend to be consistent with the overall impedance of the fourth path even when the data signal is transmitted through the third transistor T3. Therefore, the impedance difference between the third path and the fourth path may be reduced, improving the display effect.

As an example, in one embodiment, an area of an orthogonal projection of the first output pin 211 on the substrate of the display panel may be larger than an area of an orthogonal projection of the second output pin 212 on the substrate of the display panel. That is, the first output pin 211 may be designed to be larger, and the second output pin 212 may be designed to be smaller. When the first output pin and the second output pin are made of same materials, the impedance of one output pin may be smaller when the area of the output pin is larger. For example, in the first direction X, the width of the first output pin 211 may be larger than the width of the second output pin 212, and the length of the first output pin 211 may be equal to the length of the second output pin 212 in the second direction Y.

In another implementation manner of reducing the impedance difference between the third path and the fourth path, the overall impedance of the connection line used to connect the devices on the third path may be reduced.

Figure 10:
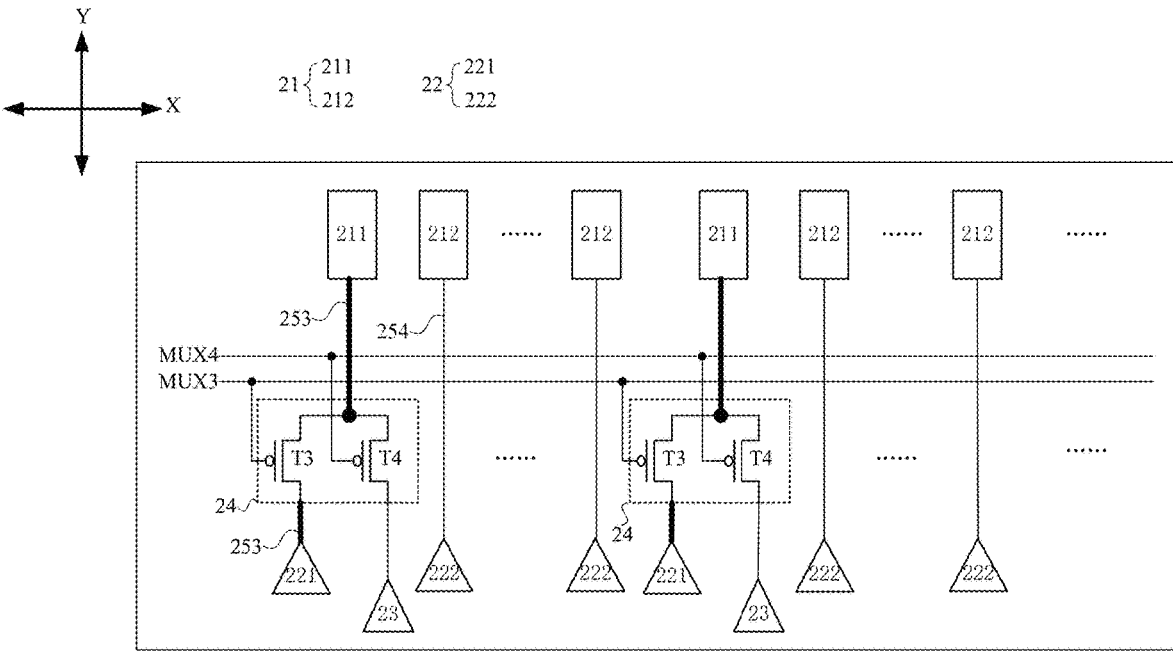
FIG. 10 illustrates a schematic structure of another exemplary driving chip consistent with various disclosed embodiments in the present disclosure.

For example, in one embodiment, as shown in FIG. 10, the first output pin 211 may be connected to the first display driving circuit 221 through a third connection line 253, and the second output pin 212 may be connected to the second display driving circuit 222 through a fourth connection line 254.

The third connection line 253 may include two sections. One section of the third connection line 253 may be connected between the first output pin 211 and the third transistor T3, and another section may be connected between the third transistor T3 and the first display driving circuit 221.

For example, when the wiring length of the third connection line 253 and the wiring length of the second connection line 254 are substantially equal, the impedance per unit length of the third connection line 253 may be smaller than the impedance per unit length of the second connection line 254. Therefore, the overall impedance of the third connection line 253 may be reduced to reduce the impedance difference between the third path and the fourth path.

For another example, when the impedance per unit length of the third connection line 253 is substantially equal to the impedance per unit length of the second connection line 254, the length of the third connection line 253 may be designed to be smaller than the length of the second connection line 254. Therefore, the overall impedance of the third connection line 253 may also be reduced.

In one embodiment, the wiring width of the third connection line 253 may be larger than the wiring width of the second connection line 254, thereby reducing the impedance per unit length of the third connection line 253.

In another embodiment, the third connection line 253 and the second connection line 254 may be made of a same material.

The present disclosure also provides a display device. In one embodiment shown in FIG. 11, the display device 1000 may include a display panel 100 and a driving chip 200 provided by various embodiments of the present disclosure. The display device provided by the present disclosure may have similar advantages as the display panel provided by various embodiments of the present disclosure.

The display panel 100 may include a plurality of bonding terminals 15. The plurality of bonding terminals 15 may include first bonding terminals 151. The driving chip 200 may include a plurality of output pins 21, and the plurality of output pins 21 may include first output pins 211. The first output pins 211 of the driving chip 200 and the first bonding terminals 151 of the display panel 100 may be connected in a one-to-one correspondence.

Further, the plurality of bonding terminals 15 may also include second bonding terminals 152, and the plurality of output pins 21 may further include second output pins 212. The second output pins 212 and the second bonding terminals 152 may be connected in a one-to-one correspondence.

The display device provided by the embodiments of the present disclosure may have the beneficial effects of the display panel and driving chip provided by the embodiments of the present disclosure. For details, the reference may be made to the above-mentioned embodiments for specific descriptions of the display panel and driving chip, which will not be described again here.

Figure 11:
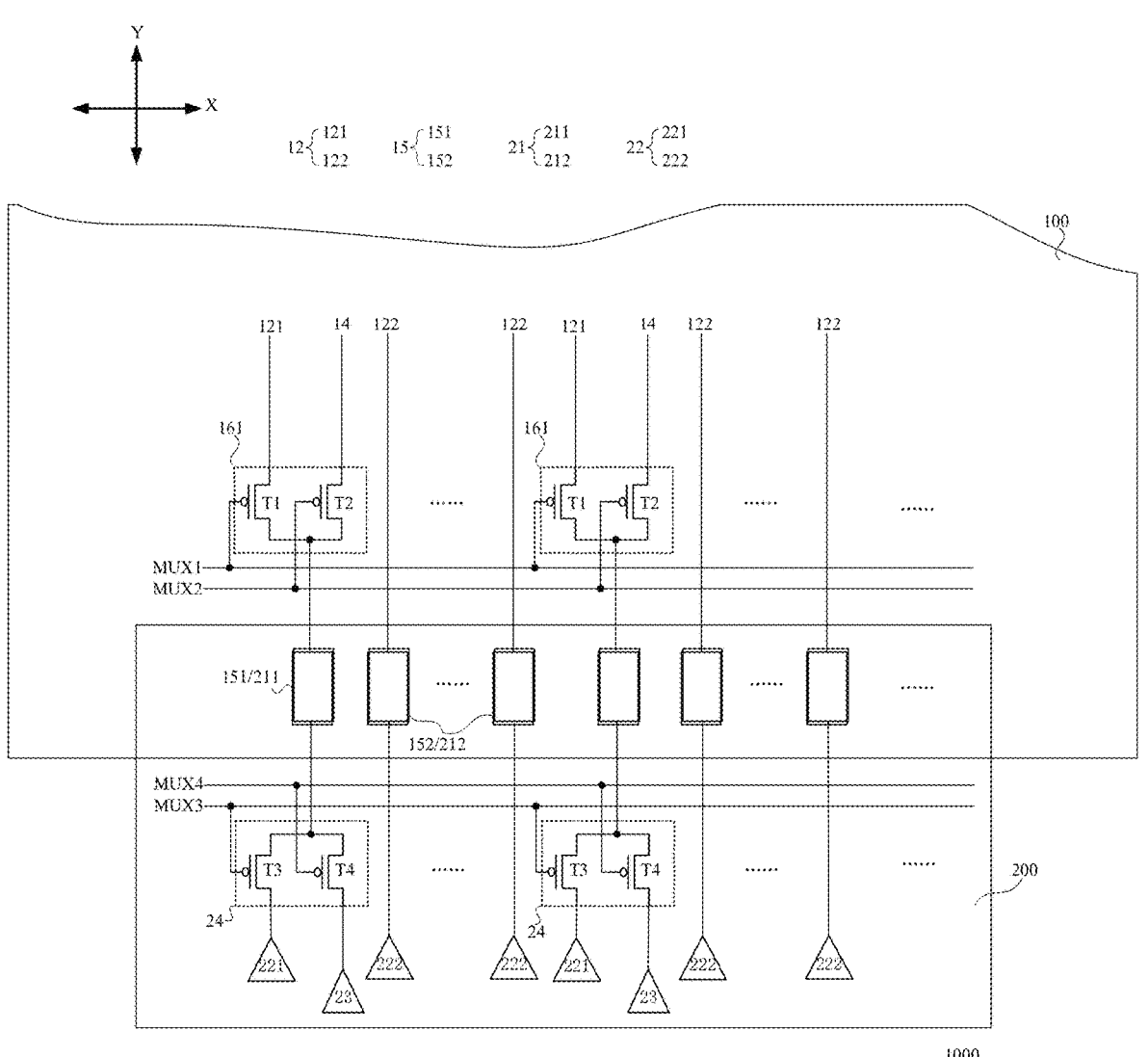
FIG. 11 illustrates an exemplary display device consistent with various disclosed embodiments in the present disclosure.

The embodiment in FIG. 11 only uses a mobile phone as an example to illustrate the display device 1000. It can be understood that the display device provided by the various embodiments of the present disclosure may be a wearable product, a computer, a television, a vehicle-mounted display device, or other devices with display functions. The type of the display device is not specifically limited in the present disclosure.

One transistor in various embodiments of the present disclosure may be a P-type transistor or an N-type transistor. For the P-type transistor, the turn-on level is low level and the turn-off level is high level. That is, when the gate potential of the P-type transistor is at a low level, the first and second terminals of the P-type transistor are electrically connected. When the gate potential of the P-type transistor is at a high level, the first and second terminals of the P-type transistor are disconnected. For the N-type transistor, the turn-on level is high level and the cut-off level is low level. That is, when the gate potential of the N-type transistor is at a high level, the first and second terminals of the N-type transistor are electrically connected. When the gate potential of the N-type transistor is at a low level, the first and second terminals of the N-type transistor are disconnected. In specific implementation, the gate terminal of each of the above-mentioned transistors serves as its control terminal, and according to the signal of the gate terminal of each transistor and its type, its first terminal may be used as the source terminal and its second terminal may be used as the drain terminal, or, its first terminal may be used as the drain terminal and its second terminal may be used as the source terminal. No distinction is made here. Further, the turn-on level and the turn-off level in the embodiments of the present disclosure are widely defined, and the turn-on level refers to any level that can turn on the transistor and the turn-off level refers to any level that can turn off the transistor.

In the present disclosure, relational terms such as "first" and "second" are only used to distinguish one entity or operation from another entity or operation, and do not necessarily require or imply that there is a relationship between these entities or operations. There is no such actual relationship or sequence. Furthermore, the terms "comprises", "include", or any other variations thereof are intended to cover a non-exclusive inclusion such that a process, method, article, or apparatus that includes a list of elements includes not only those elements, but also those not expressly listed, or elements inherent to the process, method, article or equipment. Without further limitation, an element defined by the statement "comprises a . . . " does not exclude the presence of additional identical elements in a process, method, article, or apparatus that includes the stated element.

Various embodiments have been described to illustrate the operation principles and exemplary implementations. It should be understood by those skilled in the art that the present disclosure is not limited to the specific embodiments described herein and that various other obvious changes, rearrangements, and substitutions will occur to those skilled in the art without departing from the scope of the disclosure. Thus, while the present disclosure has been described in detail with reference to the above described embodiments, the present disclosure is not limited to the above described embodiments, but may be embodied in other equivalent forms without departing from the scope of the present disclosure, which is determined by the appended claims.

What is claimed is:

1. A display panel, comprising:

a plurality of pixel columns connected to a plurality of data lines, wherein the plurality of data lines includes first data lines;

a plurality of touch channels connected to a plurality of touch leads;

a plurality of bonding terminals including first bonding terminals, wherein the first bonding terminals are used for transmission of data signals and touch signals in a time-sharing manner; and first gating circuits, wherein one first gating circuit is connected between one corresponding first bonding terminal, one corresponding first data line, and one corresponding touch lead, and is used to connect the corresponding first data line and the corresponding touch lead to the corresponding first bonding terminal in a time-sharing manner, wherein:

the plurality of bonding terminals include second bonding terminals;

the plurality of data lines includes second data lines; and the second bonding terminals are directly connected to the second data lines without passing through a first gating circuit, and the second bonding terminals are not connected to the plurality of touch leads.

2. The display panel according to claim 1, wherein:

the plurality of bonding terminals are arranged in at least one row along a first direction, and the first bonding terminals and the second bonding terminals are alternately distributed.

3. The display panel according to claim 2, wherein:

the first bonding terminals are distributed evenly in the first direction.

4. The display panel according to claim 1, wherein:

impedance of the first bonding terminals is smaller than impedance of the second bonding terminals.

5. The display panel according to claim 4, wherein:

an area of an orthographic projection of one first bonding terminal on a substrate of the display panel is larger than an area of an orthographic projection of one second bonding terminal on the substrate.

6. The display panel according to claim 1, wherein:

the one first gating circuit includes a first transistor and a second transistor, wherein the first transistor is connected between the corresponding first data line and the corresponding first bonding terminal, and the second transistor is connected between the corresponding touch lead and the corresponding first bonding terminal;

a pixel of the display panel includes a pixel circuit, wherein the pixel circuit includes a driving transistor and a switching transistor; and a width-to-length ratio of a channel of the first transistor is larger than a width-to-length ratio of a channel of the switching transistor.

7. The display panel according to claim 1, wherein:

one first bonding terminal is connected to one corresponding first data line through a first connection line, and one second bonding terminal is connected to one corresponding second data line through a second connection line; and impedance per unit length of the first connection line is smaller than impedance per unit length of the second connection line, and/or, a length of the first connection line is smaller than a length of the second connection line.

8. The display panel according to claim 7, wherein:

a wiring width of the first connection line is larger than a wiring width of the second connection line.

9. The display panel according to claim 1, further including second gating circuits, wherein:

one second gating circuit includes a first gating unit and a second gating unit;

the first gating unit is connected between multiple corresponding first data lines and one corresponding first gating circuit; and the second gating unit is connected between multiple corresponding second data lines and one corresponding second bonding terminal.

10. A driving chip, comprising:

a plurality of output pins including first output pins, wherein the first output pins are used to transmit data signals and touch signals in a time-sharing manner;

a plurality of display driving circuits including first display driving circuits;

a plurality of touch driving circuits; and third gating circuits, wherein one third gating circuit is connected between one corresponding first output pin, one corresponding first display driving circuit, and one corresponding touch driving circuit, to connect the corresponding first display driving circuit and the corresponding touch driving circuit to the corresponding first output pin in a time-sharing manner.

11. The driving chip according to claim 10, wherein:

one first display driving circuit and one corresponding touch driving circuit are directly connected to one corresponding first output pin through different connection lines;

when the first display driving circuit transmits a data signal to the corresponding first output pin, the corresponding touch drive circuit is in a non-working state; and when a touch signal is transmitted between the corresponding touch drive circuit and the corresponding first output pin, the first display drive circuit is in a non-working state.

12. The driving chip according to claim 10, wherein:
the plurality of display driving circuits include second display driving circuits, and the plurality of output pins include second output pins; and
one second output pin is connected to one corresponding second display driving circuit, and the second output pins are not connected to the plurality of touch drive circuits.

13. The driving chip according to claim 12, wherein:
the plurality of output pins are arranged in at least one row along a first direction, and the first output pins and the second output pins are alternately distributed.

14. The driving chip according to claim 13, wherein:
the first output pins are distributed evenly in the first direction.

15. The driving chip according to claim 12, wherein:
impedance of the first output pins is smaller than impedance of the second output pins.

16. The driving chip according to claim 15, wherein:
an area of an orthographic projection of one first output pin on a substrate of the display panel is larger than an area of an orthographic projection of one second output pin on the substrate.

17. The driving chip according to claim 12, wherein:
one first output pin is connected to one corresponding first display driving circuit through a third connection line, and one second output pin is connected to one corresponding second display driving circuit through a fourth connection line; and
impedance per unit length of the third connection line is smaller than impedance per unit length of the fourth connection line, and/or, a length of the third connection line is smaller than a length of the fourth connection line.

18. A display device comprising a display panel and a driving chip, wherein:
the display panel includes:
a plurality of pixel columns connected to a plurality of data lines, wherein the plurality of data lines includes first data lines;
a plurality of touch channels connected to a plurality of touch leads;
a plurality of bonding terminals including first bonding terminals, wherein the first bonding terminals are used for transmission of data signals and touch signals in a time-sharing manner; and
first gating circuits, wherein one first gating circuit is connected between one corresponding first bonding terminal, one corresponding first data line, and one corresponding touch lead, and is used to connect the corresponding first data line and the corresponding touch lead to the corresponding first bonding terminal in a time-sharing manner,
wherein:
the plurality of bonding terminals include second bonding terminals;
the plurality of data lines includes second data lines; and
the second bonding terminals are directly connected to the second data lines without passing through a first gating circuit, and the second bonding terminals are not connected to the plurality of touch leads;
the driving chip includes a plurality of output pins, wherein the plurality of output pins includes first output pins used to transmit data signals and touch signals in a time-sharing manner; and
the first output pins of the driving chip are connected to the first bonding terminals of the display panel.

* * * * *